United States Patent
Hedlund et al.

(10) Patent No.: US 8,792,434 B2
(45) Date of Patent: Jul. 29, 2014

(54) METHOD AND APPARATUS FOR SELECTING CONTROL CHANNEL ELEMENTS FOR PHYSICAL DOWNLINK CONTROL CHANNEL

(75) Inventors: Leo Hedlund, Älvsjö (SE); Anders Johansson, Hässelby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 474 days.

(21) Appl. No.: 13/122,852

(22) PCT Filed: Oct. 8, 2008

(86) PCT No.: PCT/SE2008/051146
§ 371 (c)(1), (2), (4) Date: Apr. 6, 2011

(87) PCT Pub. No.: WO2010/041993
PCT Pub. Date: Apr. 15, 2010

(65) Prior Publication Data
US 2011/0194524 A1    Aug. 11, 2011

(51) Int. Cl.
*H04W 48/12* (2009.01)
*H04L 5/00* (2006.01)

(52) U.S. Cl.
CPC .................................. *H04L 5/0053* (2013.01)
USPC ....................................................... 370/329

(58) Field of Classification Search
CPC ................................................... H04L 5/0053
USPC ................................................ 370/329, 330
See application file for complete search history.

(56) References Cited

U.S. PATENT DOCUMENTS

| 8,068,457 B2* | 11/2011 | Pi et al. ........................ 370/329 |
| 8,254,245 B2* | 8/2012 | Kim et al. ..................... 370/207 |
| 2008/0232322 A1* | 9/2008 | Heo et al. ..................... 370/330 |

FOREIGN PATENT DOCUMENTS

| WO | WO 2008/111808 | 9/2008 |
| WO | WO 2008/115021 | 9/2008 |

OTHER PUBLICATIONS

International Preliminary Report on Patentability for International Application No. PCT/SE2008/051146; Date of issuance of this report: Apr. 12, 2011; 8 pages.
International Search Report for PCT/SE2008/051146, dated Oct. 26, 2009.
Panasonic; *Semi-Static vs. Dynamic CCE Aggregation*, 3GPP TSG-RAN WG1 Meeting #49, R1-072072, Kobe, Japan May 2-11, 2007, pp. 1-5.
Motorola; *Control Symbol Power Limitation and REG Interleaving*, 3GPP Draft; R1-080550 (R1-080098), Sevilla, Spain, Jan. 19, 2008, 7 pages.
Zte; *CCE Allocation Scheme in PDCCH for Efficient Blind Detection*, 3GPP TSG-RAN WG1 #51, R1-074559, Jeju, Korea, Nov. 5-9, 2001 pp. 1-3.
Love et al., *Downlink Control Channel Design for 3GPP LTE*, IEEE Communications Society, Wireless Communications and Networking Conference, Piscataway, NJ, Mar. 31, 2008, pp. 813-818.

* cited by examiner

*Primary Examiner* — Ricky Ngo
*Assistant Examiner* — Ben H Liu
(74) *Attorney, Agent, or Firm* — Myers Bigel Sibley & Sajovec, PA

(57) ABSTRACT

A selector (40) and selection method performed at a base station (28) is configured to determine which control channel element(s) (CCE(s)) to use for a physical downlink control channel (PDCCH) comprising a subframe according to criteria that improves performance of a telecommunications system (20).

18 Claims, 7 Drawing Sheets

COST MATRIX

| CCE_COMBINATION j | CCE INDICES | OFDM(0) | OFDM(1) | OFDM(2) |
|---|---|---|---|---|
| 0 | 0,1 | 8 | 4 | 6 |
| 1 | 2,3 | 6 | 6 | 6 |
| 2 | 4,5 | 2 | 4 | 12 |
| ... | ... | ... | ... | ... |
| 9 | 18,19 | 4 | 8 | 6 |

*Fig. 7*

METHOD AND APPARATUS FOR SELECTING CONTROL CHANNEL ELEMENTS FOR PHYSICAL DOWNLINK CONTROL CHANNEL

CROSS-REFERENCE TO RELATED APPLICATIONS

This application is a 35 U.S.C. §371 national stage application of PCT International Application No. PCT/SE2008/051146, filed on Oct. 8, 2008, the disclosure and content of which is incorporated by reference herein in its entirety. The above-referenced PCT International Application was published in the English language as International Publication No. WO 2010/041993 on Apr. 15, 2010.

TECHNICAL FIELD

This invention pertains to telecommunications, and particularly to method and apparatus for formation of control channels in subframes of information that are transmitted over a radio interface using plural subcarriers.

BACKGROUND

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability, e.g., mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB", "B node", or (in LTE) eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Specifications for the Evolved Universal Terrestrial Radio Access Network (E-UTRAN) are ongoing within the $3^{rd}$ Generation Partnership Project (3GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

The evolved UTRAN (E-UTRAN) comprises evolved base station nodes, e.g., evolved NodeBs or eNBs, providing evolved UTRA user-plane and control-plane protocol terminations toward the wireless terminal. The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

Only the Packet Switched (PS) domain will be supported by Long Term Evolution (LTE), i.e. all services are to be supported in the PS domain. The Long Term Evolution (LTE) standard will be based on multi-carrier based radio access schemes such as Orthogonal Frequency-Division Multiplexing (OFDM) in the downlink and SC-FDMA in the uplink. Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion.

In the time domain, one subframe of 1 ms duration is divided into 12 or 14 OFDM (or SC-FDMA) symbols, depending on the configuration. One OFDM (or SC-FDMA) symbol comprises a number of sub-carriers in the frequency domain, depending on the channel bandwidth and configuration. One OFDM (or SC-FDMA) symbol on one sub-carrier is referred to as an resource element (RE). See, e.g., 3GPP Technical Specification 36.211, V8.3.0 (2008 May), Technical Specification Group Radio Access Network; Evolved Universal Terrestrial Radio Access (E-UTRA); Physical channels and Modulation (Release 8), which is incorporated herein by reference in its entirety.

In Long Term Evolution (LTE) no dedicated data channels are used, instead shared channel resources are used in both downlink and uplink. These shared resources, the downlink shared channel (DL-SCH) and the uplink shared channel (UL-SCH), are each controlled by one or more schedulers that assign(s) different parts of the downlink and uplink shared channels to different UEs for reception and transmission respectively.

The assignments for the downlink shared channel (DL-SCH) and the uplink shared channel (UL-SCH) are transmitted in a control region covering a few OFDM symbols in the beginning of each downlink subframe. The downlink shared channel (DL-SCH) is transmitted in a data region covering the rest of the OFDM symbols in each downlink subframe. The size of the control region is either, one, two, three or four OFDM symbols and is set per subframe.

Each assignment for downlink shared channel (DL-SCH) or uplink shared channel (UL-SCH) is transmitted on a physical channel named the Physical Downlink Control Channel (PDCCH) in the control region. There are typically multiple PDCCHs in each subframe, and each wireless terminal (UE) will be required to monitor the PDCCHs to be able to monitor a subset of the Physical Downlink Control Channels (PDCCHs).

A Physical Downlink Control Channel (PDCCH) is mapped to (e.g., comprises) a number of control channel element (CCEs). Each control channel element (CCE) consists of thirty six resource elements (REs) A Physical Downlink Control Channel (PDCCH) comprises an aggregation of 1, 2, 4 or 8 control channel element (CCEs), See, e.g., 3GPP Technical Specification 36.213, V8.3.0 (2008 May), Technical Specification Group Radio Access Network; Evolved Universal Terrestrial Radio Access (E-UTRA); Physical Layer Procedures (Release 8), which is incorporated herein by reference in its entirety. These four different alternatives are herein referred to as aggregation level 1, 2, 4, and 8, respectively. Each control channel element (CCE) may only be utilized on one aggregation level at the time. The variable size achieved by the different aggregation levels is used to adapt the coding rate to the required block error rate (BLER) level for each Physical Downlink Control Channel (PDCCH). The total number of available control channel element (CCEs) in a subframe will vary depending on several parameters like number of OFDM symbols used for PDCCH, number of antennas, system bandwidth, Physical HARQ Indicator Channel (PHICH) size, etc.

Control channel elements (CCEs) and their constituent resource elements (REs) are spread out, both in time over the OFDM symbols used for PDCCH, and in frequency over the configured bandwidth. This is achieved through a number of operations including interleaving, and cell-specific cyclic shifts etc. These operations also serve the purpose of randomizing the mapping between different cells. All these operations are entirely known to the wireless terminals (UEs).

The ODFM symbols used for the Physical Downlink Control Channel (PDCCH) are the ones in the control region of each subframe. If more than one OFDM symbol is used for the PDCCH (e.g., two, three or four), the PDCCH resource elements (REs) of different OFDM symbols will differ in some aspects In the very first OFDM symbol for a PDCCH, the amount of resource elements (REs) left for control channel elements (CCEs) is reduced due to the reference signals (RSs) and symbols for PCFICH which are also in the first OFDM symbol. Furthermore, the PHICH is also allocated resources only in the very first OFDM symbol for PDCCH, in the case of normal PHICH duration being configured. Also, multiple antenna transmission may require that additional resource elements (REs) are made unavailable for PDCCH control channel elements (CCEs). Also these resource elements (REs) are present in the first or potentially first two OFDM symbols, depending on the number of configured transmit antennas.

Furthermore, the resource elements (REs) corresponding to a certain control channel element (CCE) are spread over the OFDM symbols used for the control region in a random fashion. This is achieved by using a fixed interleaving pattern followed by a cell specific cyclic shift.

Resource elements (REs) available for control channel elements (CCEs) are typically not fully utilized for transmission. This is a result of limited UE search spaces and the rough granularity of the configurable number of control channel elements (CCEs), where for a certain configuration, there are at most three different alternatives, corresponding to three different numbers of OFDM symbols used for PDCCH.

Resource elements (REs) for reference signals (RSs) and PCFICH, on the other hand, are utilized for transmission by definition. Also PHICH has another utilization pattern compared to the control channel elements (CCEs) for PDCCH transmission. Moreover, there are the resource elements (REs) which per definition are unused due to reference signal transmission on another antenna port. The impact of these unused resource elements (REs) is visible especially for the second OFDM symbol in case of four antenna ports being configured for transmission.

When it comes to selecting control channel elements (CCEs) for a certain purpose, e.g. for a down link assignment for a certain UE, a number of consecutive control channel elements (CCEs) fulfilling certain restrictions must be selected for this purpose. There are often several possible choices for the control channel element (CCE) selection. Typically the conventional control channel element (CCE) selection approach has been random, routine, or rigid (e.g., lowest CCE index, etc.). In at least some situations the conventional control channel element (CCE) selection techniques are improvident.

For example, using conventional CCE selection techniques the total load, in terms of utilized resource elements (REs), in the different OFDM symbols used for control could vary substantially. This is a problem for different reasons. One reason is that the power available for usage in each OFDM symbol is limited. Furthermore, power not utilized in one OFDM symbol can not be utilized in a later OFDM symbol, but is lost in a sense. Another potential problem is that the load variations of different OFDM symbols causes an uneven interference balance between different OFDM symbols. Assuming the same power spectral density (PSD) for different type of resource elements (REs), the inter cell interference would typically be more severe in the first OFDM symbol for PDCCH transmission compared to potential later ones. By introducing power control functionality, e.g. reference signal (RS) or PCFICH power boosting, the effects of uneven power distribution among different PDCCH OFDM symbols could increase even further. This may reduce an already limited PDCCH capacity, resulting in an even lower system capacity.

SUMMARY

In accordance with one of its aspects, technology described herein concerns a base station node for a telecommunications system. The base station comprises a transceiver and a selector. The transceiver is configured to transmit a subframe of information for transmission over a radio interface. Symbols of the subframe are transmitted on plural sub-carriers in a frequency domain. One symbol on one sub-carrier in the sub-frame comprises a resource element; a predetermined number of resource elements comprises a control channel element. The selector is configured to determine which control channel element(s) to use for a physical downlink control channel (PDCCH) comprising the subframe according to criteria that improves performance of the telecommunications system.

In one example embodiment, the criteria is predetermined distribution of total number of transmitted resource elements per symbol, e.g., a most even distribution of the total number of transmitted resource elements per symbol. In another example embodiment, the criteria is a predetermined distribution of total used transmission power per symbol, e.g., a most even distribution of total number of transmission power per symbol. In yet another example embodiment, the criteria is a predetermined distribution of interference per symbol, e.g., a most even distribution of interference per symbol.

In an example implementation, the selector is configured to determine which control channel element(s) to use for the physical downlink control channel (PDCCH), for plural combinations of control channel element(s), by: (1) evaluating a cost function C(j) for each valid combination (j) of control channel element(s) over symbols comprising a control portion of the subframe; and (2) using evaluations of the cost function C(j) to select a valid combination of control channel element(s) according to the criteria that improves the performance. The number of control channel elements (CCEs) included in the valid combination of control channel element(s) is dependent upon an aggregation level utilized for the PDCCH.

In an example implementation, in calculating the cost function C(j) the selector is configured, for each valid combination of control channel element(s) to include, in the evaluations of the cost function C(j) over all symbols comprising a control portion of the subframe of control channel(s), cost(s) other than the physical downlink control channel (PDCCH).

In an example embodiment, in order to determine which control channel element(s) to use for a physical downlink control channel (PDCCH), the selector is configured to: (a) prepare a cost matrix to express, for each potential combination of control channel element(s), a number of resource element groups residing in each symbol of a control portion of the subframe; (b) determine which of the potential combinations of control channel element(s) is a valid combination of control channel element(s); and (c) evaluate a cost function C(j) for each valid combination (j) of control channel element(s) over symbols comprising a control portion of the subframe.

In another of its aspects, technology described herein concerns a method of operating a telecommunications system. The method comprises constructing a subframe of information for transmission over a radio interface. Symbols of the subframe are transmitted on plural sub-carriers in a frequency domain; one symbol on one sub-carrier in the sub-frame comprises a resource element; and, a predetermined number of resource elements comprises a control channel element. The method further comprises selecting which control channel element(s) to use for a physical downlink control channel (PDCCH) comprising the subframe according to criteria that improves performance of the telecommunications system.

In accordance with one example mode of the method, the criteria is predetermined distribution of total number of transmitted resource elements per symbol, e.g., a most even distribution of the total number of transmitted resource elements per symbol. In accordance with another example mode of the method, the criteria is a predetermined distribution of total used transmission power per symbol, e.g., a most even distribution of total number of transmission power per symbol. In yet another example embodiment, the criteria is a predetermined distribution of interference per symbol, e.g., a most even distribution of interference per symbol.

In an example implementation of the method, the act of selecting which control channel element(s) to use for the physical downlink control channel (PDCCH) comprises, for plural combinations of control channel element(s): (1) evaluating a cost function C(j) for each valid combination (j) of control channel element(s) over symbols comprising a control portion of the subframe; (2) using evaluations of the cost function C(j) to select a valid combination of control channel element(s) according to the criteria that improves the performance. The number of control channel elements (CCEs) included in the valid combination of control channel element(s) is dependent upon an aggregation level utilized for the PDCCH.

In an example implementation of the method, the act of evaluating the cost function C(j) comprises, for each valid combination of control channel element(s) including, in the evaluations of the cost function C(j) over all symbols comprising a control portion of the subframe of control channel(s), cost(s) other than the physical downlink control channel (PDCCH).

In an example implementation of the method, the act of selecting which control channel element(s) to use for a physical downlink control channel (PDCCH) comprises: (a) preparing a cost matrix to express, for each potential combination of control channel element(s), a number of resource element groups residing in each symbol of a control portion of the subframe; (b) determining which of the potential combinations of control channel element(s) is a valid combination of control channel element(s); and (c) evaluating a cost function C(j) for each valid combination (j) of control channel element(s) over symbols comprising a control portion of the subframe.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is a diagrammatic view illustrating a portion of an example cost matrix.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
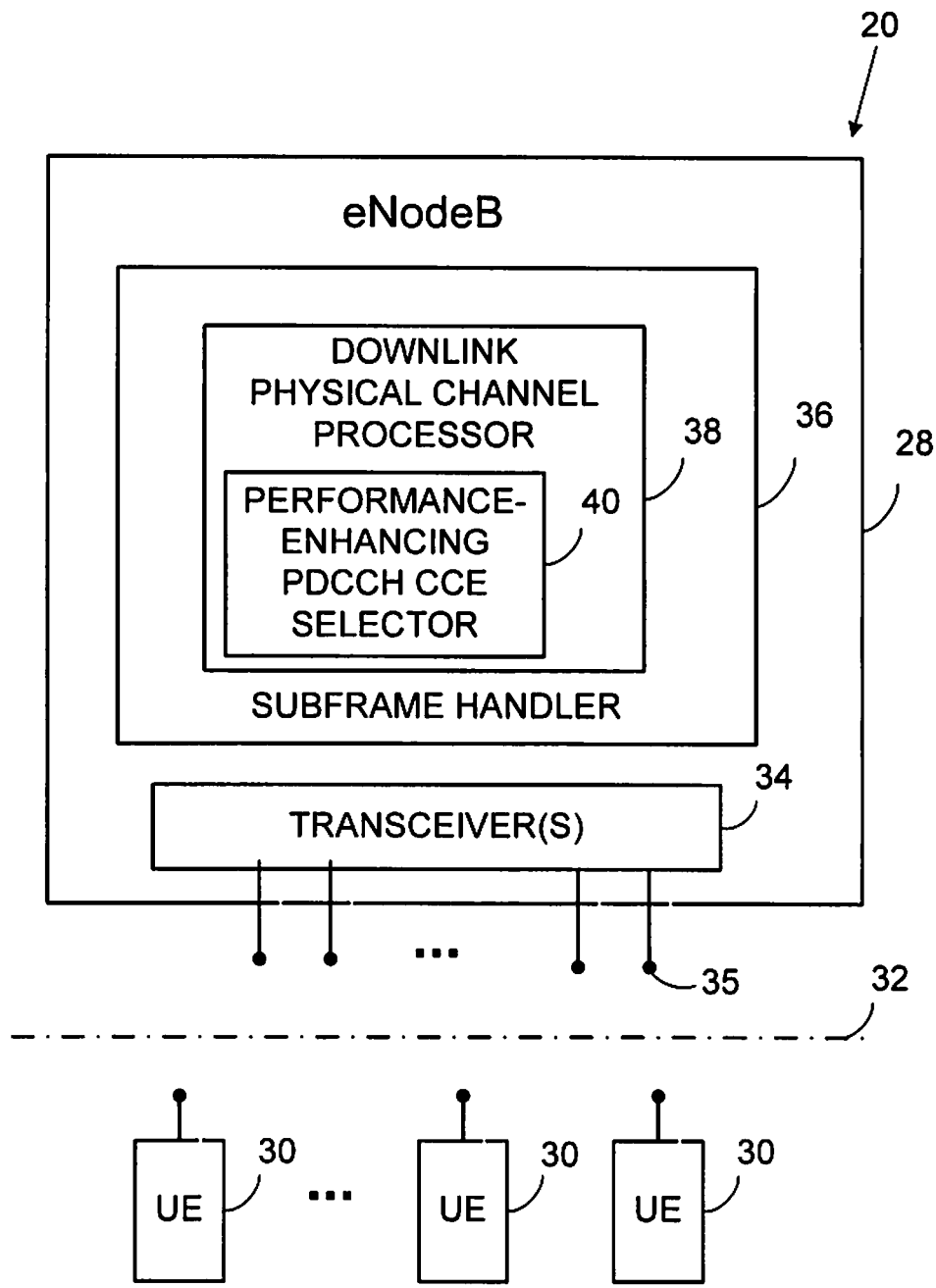
FIG. 1 is a schematic view of portions of a radio access network according to an example embodiment.

FIG. 1 shows portions of radio access network (RAN) of a telecommunications system 20, and particularly a node in the form of base station 28 or "eNodeB" which communicates with plural wireless terminals 30 or over a radio or air interface 32. It will be appreciated that the radio access network (RAN) typically comprises numerous other nodes, such as other base station nodes (and, in some embodiments, other nodes such as control nodes and the like). Only one node is shown in FIG. 1 for sake of simplicity, and only selected elements or functional units which are germane to the technology disclosed herein. The person skilled in the art will understand that a typical base station node or ENodeB has many other functional units and structures for which description need not be included herein.

The base station 28 comprises one or more transceiver(s) 34 which is/are configured to transmit a subframe of information for transmission over the radio interface 32. For downlink transmission to the wireless terminals 30, the transceiver(s) 34 feed plural antennae 35 which function to provide plural sub-carriers. The transceiver(s) 34 thereby transmit symbols of the subframe on plural sub-carriers in a frequency domain.

Figure 2:
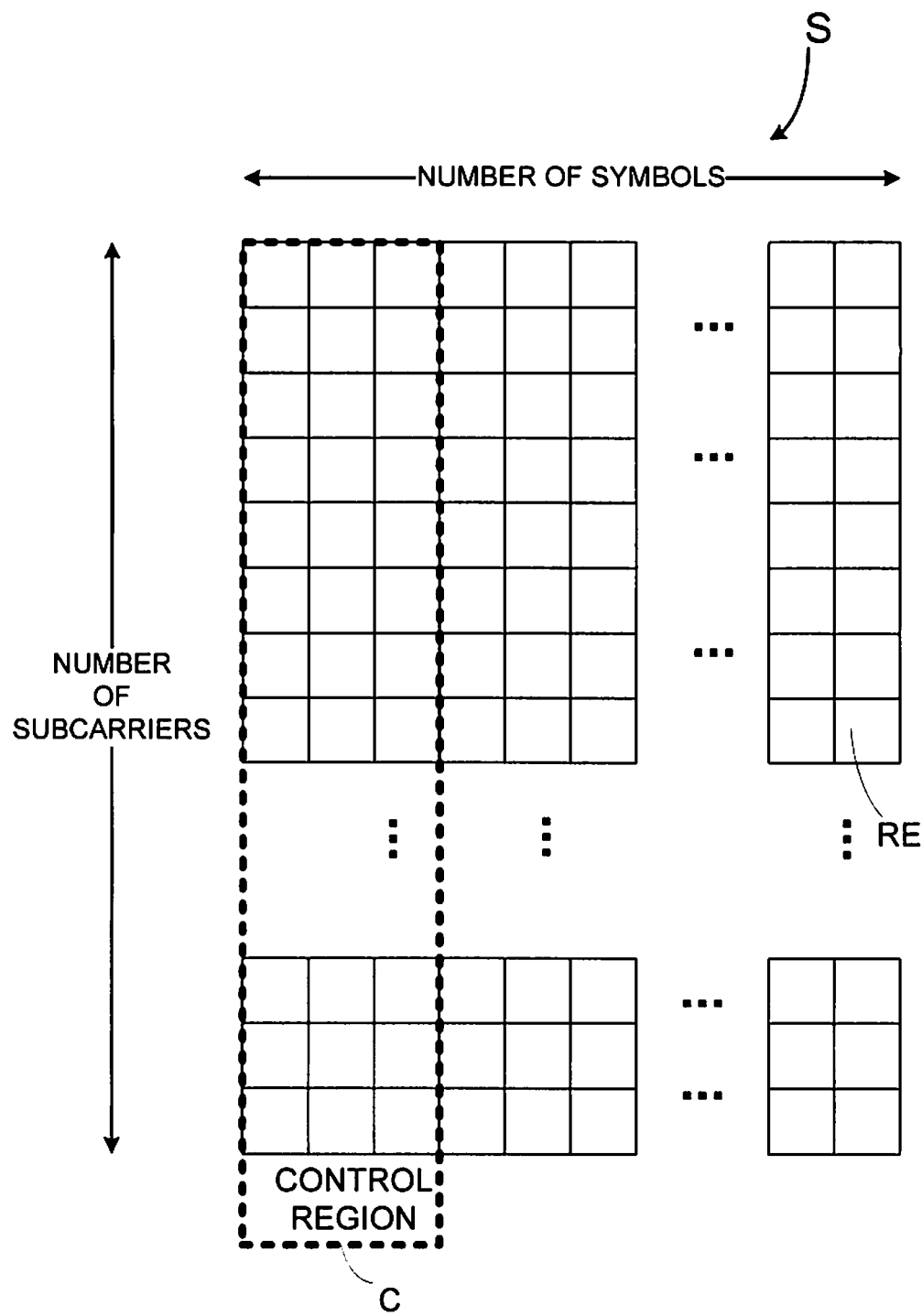
FIG. 2 is a diagrammatic view of a representative, sample subframe.

The base station 28 also comprises subframe handler 36. The subframe handler 36 is configured to prepare or format a subframe of information for transmission by transceiver(s) 34 on a downlink to the wireless terminals 30. A representative, sample depiction of a subframe S is shown in FIG. 2. The subframe S is illustrated in the form of a downlink resource grid comprised of resource elements (RE). Each column of the two dimensional grid of FIG. 2 represents a symbol (e.g., an OFDM symbol); each row of the grid of FIG. 2 represents a subcarrier. A resource element (RE) is the smallest time-frequency unit for downlink transmission in the subframe S. That is, one symbol on one sub-carrier in the sub-frame comprises a resource element. As also mentioned above, a predetermined number of resource elements comprises a control channel element (CCE). For example, typically a control channel element (CCE) has thirty six resource elements (REs).

Details of the subframe S and the resource grid are provided in 3GPP Technical Specification 36.211, V8.3.0 (2008 May), Technical Specification Group Radio Access Network; Evolved Universal Terrestrial Radio Access (E-UTRA); Physical channels and Modulation (Release 8), which is incorporated herein by reference. The subframe S comprises downlink physical channels, each of which corresponds to a set of resource elements which carry information originating from layer one or higher layers. The physical signals reference signal (RS), synchronization signal, and Physical Broadcast Channel are carried on subframes. The downlink physical channels of subframe S comprise the Physical Downlink Share Channel (PDSCH), the Physical Broadcast Channel (PBCH), the Physical Multicast Channel (PMCH), the Physical Control Format Indicator channel (PCFICH), the Physical Downlink Control Channel (PDCCH), the Physical Hybrid ARQ Indicator Channel (PHICH), a reference signal (RS), and a synchronization signal.

As indicated above, each subframe S includes a control portion. Depending on implementation, the size of the control portion can be either one, two, three, or four OFDM symbols. The subframe S of FIG. 2 happens to illustrate a control portion C having three OFDM symbols (e.g., three columns of the grid of subframe S are shown as forming the control region C). The control portion C of subframe S includes the aforementioned Physical Downlink Control Channel (PDCCH), the aforementioned Physical Hybrid ARQ Indicator Channel (PHICH), and the aforementioned Physical Control Format Indicator channel (PCFICH), as well as reference signals (RS).

The subframe handler 36 of base station 28, mentioned above, serves for formatting and processing of a subframe S such as that described above and depicted in FIG. 2. The subframe handler 36 in turn comprises downlink physical channel processor 38, which prepares physical downlink channels such as those described above.

As mentioned above, one of the downlink channels is the Physical Downlink Control Channel (PDCCH). As also indicated above, the Physical Downlink Control Channel (PDCCH) is used for carrying assignments for the downlink shared channel (DL-SCH) and/or the uplink shared channel (UL-SCH), e.g., for advising where in the subframe these other channels may be found. There are typically multiple PDCCHs in the control portion of each subframe, and each wireless terminal (UE) will be required to monitor the PDCCHs to be able to detect the assignments directed to them.

The base station 28 must know which resource elements (REs) are to compose the Physical Downlink Control Channel (PDCCH). In actuality, formation of the Physical Downlink Control Channel (PDCCH) is conceptualized as being in terms, not of resource elements (REs) per se, but in terms of control channel elements (CCEs). It will be recalled that, according to an example specification, a control channel element (CCE) consists of thirty six resource elements (REs). Typically there are more control channel elements (CCEs) available for formation of a single Physical Downlink Control Channel (PDCCH) than are actually needed. So the base station 28 needs some mechanism for determining which control channel elements (CCEs) to select for each Physical Downlink Control Channel (PDCCH).

The downlink physical channel processor 38 comprises a selector 40 which, in a non-limiting example implementation, has the responsibility of determining which control channel elements (CCEs) to include in the Physical Downlink Control Channel (PDCCH). The selector 40 is also known as the PDCCH CCE selector 40. Unlike prior art techniques of routinely including arbitrary or next available control channel elements (CCEs) in the Physical Downlink Control Channel (PDCCH), PDCCH CCE selector 40 of base station 28 is configured to determine judiciously which control channel element(s) to use for a physical downlink control channel (PDCCH) comprising the subframe. Specifically, the PDCCH CCE selector 40 is configured to determine which control channel element(s) to use for a physical downlink control channel (PDCCH) comprising the subframe according to criteria that improves performance of the telecommunications system.

Figure 3:
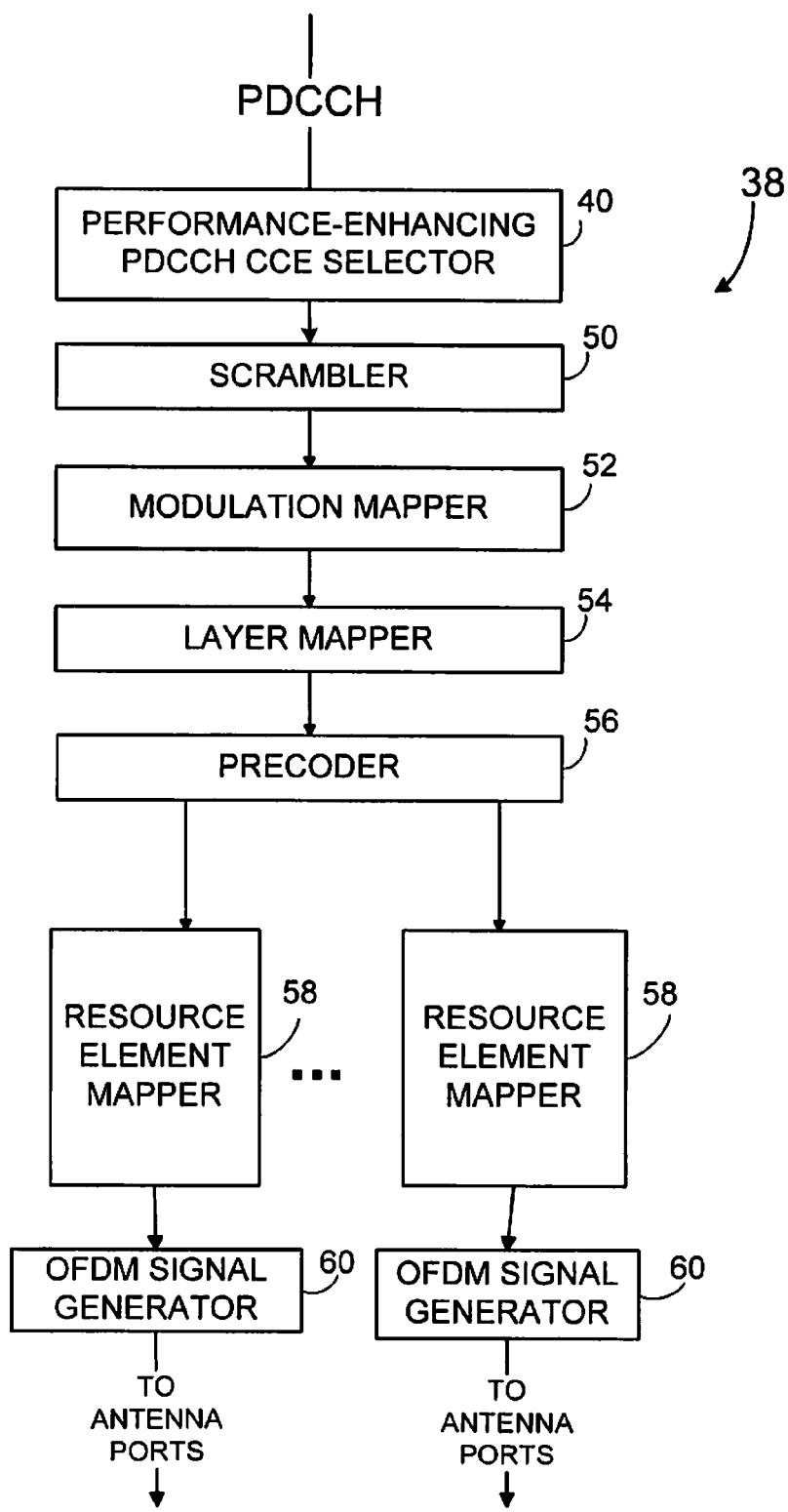
FIG. 3 is a schematic view of a downlink physical channel processor comprising a base station node.

FIG. 3 shows, in more detail, selected aspects of an example embodiment of downlink physical channel processor 38 for base station 28. The illustrated, non-limiting embodiment of downlink physical channel processor 38 comprises PDCCH CCE selector 40, scrambler 50, modulation mapper 52, layer mapper 54, precoder 56, resource element mappers 58, and OFDM signal generators 60. The PDCCH CCE selector 40 receives the PDCCH. The scrambler 50 receives the code word for the PDCCH and scrambles code bits in the code word to be transmitted on a physical channel. The modulation mapper 52 modulates the scrambled bits to generate complex-valued modulation symbols. The layer mapper 54 maps the complex-valued modulation symbols onto one or several transmission layers. The precoder 56 precodes the complex-valued modulation symbols on each layer for transmission on the antenna ports. The resource element mappers 58 map the complex-valued modulation symbols for each antenna port to resource elements. The OFDM signal generators 60 generate a complex-valued time-domain OFDM signal for each antenna port.

As indicated above, the PDCCH CCE selector 40 determines which control channel element(s) to use for a physical downlink control channel (PDCCH) comprising the subframe, and advantageously does so according to criteria that improves performance of the telecommunications system. The CCE selector 40 has knowledge of the processing that will take place in scrambler 50, modulation mapper 52, layer mapper 54, precoder 56, and resource element mapper 58, and takes into account the pre-known operation (e.g., processing logic or processing algorithms) of these units when performing the CCE selection. In the prior art this knowledge is not utilized when performing the PDCCH to CCE mapping. In at least one example embodiment the knowledge of the processing in scrambler 50, modulation mapper 52, layer mapper 54, precoder 56, and resource element mapper 58 is generally static for a given system configuration, so that in such example embodiment generally no signaling is needed from units 50-58 to unit 40. In an example embodiment, the PDCCH CCE selector 40 can be realized by a controller or processor, as those terms are expansively elaborated herein, and can execute programmed instructions stored on a readable medium.

The mapping of control channel elements (CCEs) to the time/frequency grid is dictated by standards such as the aforementioned 3GPP Technical Specification 36.211. But the selection of which control channel elements (CCEs) to include in (e.g., to use for) a Physical Downlink Control Channel (PDCCH) is determined according to the advantageous technique implemented by PDCCH CCE selector 40. For each Physical Downlink Control Channel (PDCCH), only a limited number of the potentially many available control channel elements (CCEs) are selected to compose the Physical Downlink Control Channel (PDCCH). In differing embodiments, the PDCCH CCE selector 40 of the technology disclosed herein makes prudent selection of control channel elements (CCEs) for forming the Physical Downlink Control Channel (PDCCH) in accordance with a criteria that enhances system performance, e.g., load per OFDM symbol or power usage, or interference, for example.

Figure 4:
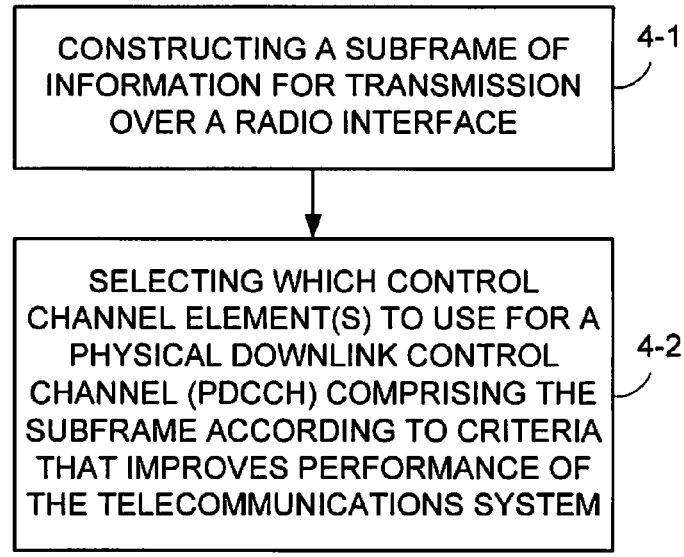
FIG. 4 illustrates example, representative, basic acts or steps that comprise a method executed or performed by an example base station.

FIG. 4 illustrates example, representative, basic acts or steps that comprise a method executed or performed by an example base station. Act 4-1 comprises constructing a subframe (such as subframe S of FIG. 2) of information for transmission over a radio interface. The symbols of the subframe are to be transmitted on plural sub-carriers in a frequency domain. As explained previously, one symbol on one sub-carrier in the sub-frame comprises a resource element, and a predetermined number of resource elements comprises a control channel element. Act 4-2, which can be subsumed or included in act 4-1, comprises selecting (e.g., by PDCCH CCE selector 40) which control channel element(s) to use for a physical downlink control channel (PDCCH) comprising the subframe according to criteria that improves performance of the telecommunications system.

Figure 5:
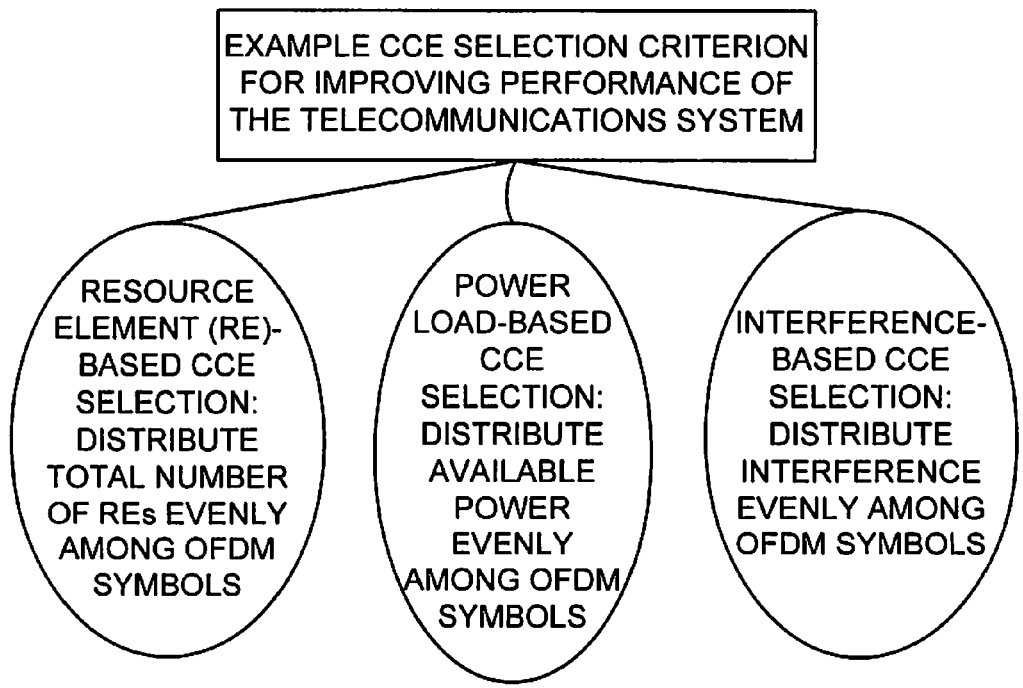
FIG. 5 is a diagrammatic view showing example, non-limiting embodiments of control channel element (CCE) selection criterion.

Example, non-limiting embodiments of control channel element (CCE) selection criterion (that improve performance of the telecommunications system) are illustrated in FIG. 5. In one example embodiment, known as resource element-based CCE selection, the criteria is predetermined distribution of total number of transmitted resource elements per symbol, e.g., a most even distribution of the total number of transmitted resource elements per symbol. In another example embodiment, known as power-based CCE selection, the criteria is a predetermined distribution of total used transmission power per symbol, e.g., a most even distribution of total number of transmission power per symbol. In yet another example embodiment, known as interference-based CCE selection, the criteria is a predetermined distribution of interference per symbol, e.g., a most even distribution of interference per symbol. These non-limiting example embodiments are discussed in more detail subsequently. It will be appreciated that other criterion embodiments are encompassed by the technology disclosed herein, these three being illustrative examples.

Figure 6:
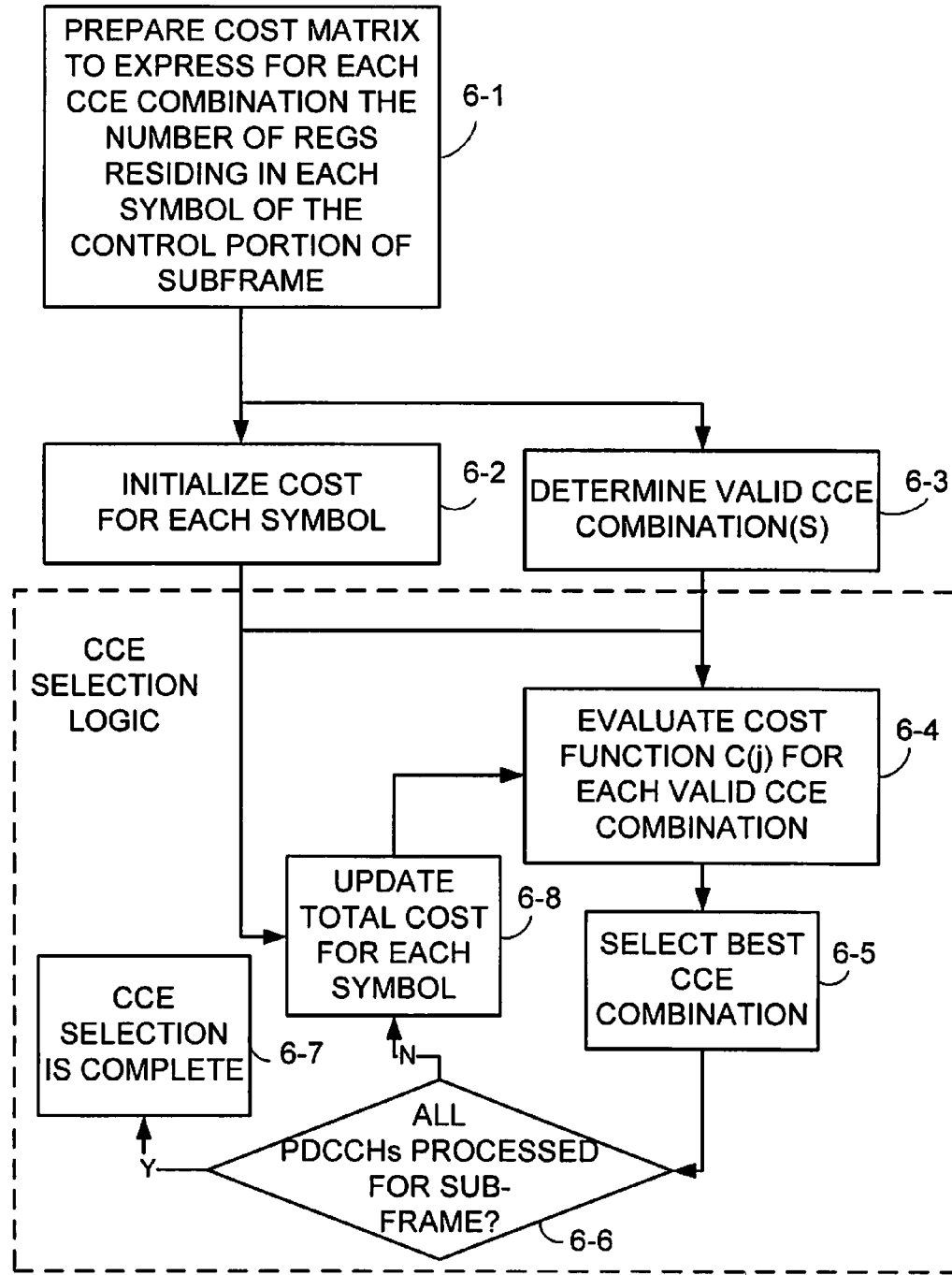
FIG. 6 is a flowchart illustrating example, representative, basic acts or steps that comprise a method and/or programmable routine executed in an example embodiment of PDCCH CCE selection.

FIG. 6 shows, in more detail, example, representative, basic acts or steps that comprise the PDCCH CCE selection act 4-2. Act 6-1 of the method of FIG. 6 comprises preparing a cost matrix to express, for each control channel element (CCE) combination, the number of resource element groups (REGs) residing in each symbol of the control region/portion of the subframe. In an example implementation, a resource element group (REG) consists of four resource elements (REs); there are nine resource element groups (REGs) per control channel element (CCE).

FIG. 7 illustrates a portion of an example cost matrix. More particularly, FIG. 7 illustrates portions of a cost matrix that pertain to a Physical Downlink Control Channel (PDCCH) of an example scenario having an aggregation level 2. In the scenario reflected by the cost matrix of FIG. 7, it is assumed that the system is a 5 MHz bandwidth system; that the aggregation level is 2; that 3 OFDM symbols (e.g., symbols OFDM(0), OFDM(1), and OFDM(2) are to be used for the control region; and, that there is a maximum of 20 control channel elements (CCEs) available in the control region. In general, for each Physical Downlink Control Channel (PDCCH) candidate the number of required control channel elements (CCEs) must be known (e.g. from link adaptation or similar), and the aggregation level of interest is known (in the example scenario above the aggregation level 2 is assumed).

The 20 control channel elements (CCEs) available in the control region are each labeled by or associated with an index. For example, a first control channel element (CCE) has index 0; a second control channel element (CCE) has index 1; a third control channel element (CCE) has index 2, and so on up to the twentieth control channel element (CCE) having index 19. In view of the fact that that the aggregation level is 2, the control channel elements (CCEs) are combined in pairs, e.g., two consecutive control channel elements (CCEs) form a combination. Each potential combination of control channel elements (CCEs) is generically referred to as CCE_combination j (which is the first column of the cost matrix of FIG. 7). Indeed, the first column of the cost matrix of FIG. 7 lists the combinations of consecutive control channel elements (CCEs) that are feasible in view of the aggregation level.

The second column of the cost matrix of FIG. 7 enumerates (by index) the particular control channel elements (CCEs) which belong to the CCE_combination of column 1. For example, CCE_combination j=0 is a combination of the control channel elements (CCEs) having indices 0 and 1 (e.g., as is thus depicted as "0,1" in the second column of the cost matrix of FIG. 7). The CCE_combination j=1 is a combination of the control channel elements (CCEs) having indices 2 and 3 (2,3), and so forth.

The third through fifth columns of the cost matrix of FIG. 7 specify the number of resource element groups (REGs) included per OFDM symbol for the given CCE_combination of the row. For example, for CCE_combination j=0, involving control channel elements (CCEs) 0,1, the first OFDM symbol of the control region (e.g., OFDM(0) has 8 resource element groups (REGs); the second OFDM symbol of the control region (e.g., OFDM(1)) has 4 resource element groups (REGs); and, the third OFDM symbol of the control region (e.g., OFDM(2)) has 6 resource element groups (REGs).

Thus, from the foregoing it is understood that, by a Physical Downlink Control Channel (PDCCH) having an aggregation level of 2 is meant that the control channel elements (CCEs) are combined in pairs, e.g., a combination of two control channel elements (CCEs) are used to form the Physical Downlink Control Channel (PDCCH). The cost matrix of FIG. 7 can thus be just one version or aspect of an overall cost matrix which could also include information for other aggregation levels, such as aggregation level 1 (one control channel element (CCE) constitutes a CCE_combination); aggregation level 4 (four control channel elements constitute a CCE_combination); or aggregation level 8 (eight control channel elements (CCEs) constitute a CCE_combination). Alternatively only a single cost matrix with costs per CCE index can be used in conjunction with a mapping of CCE combinations to CCE indices".

Figure 8:
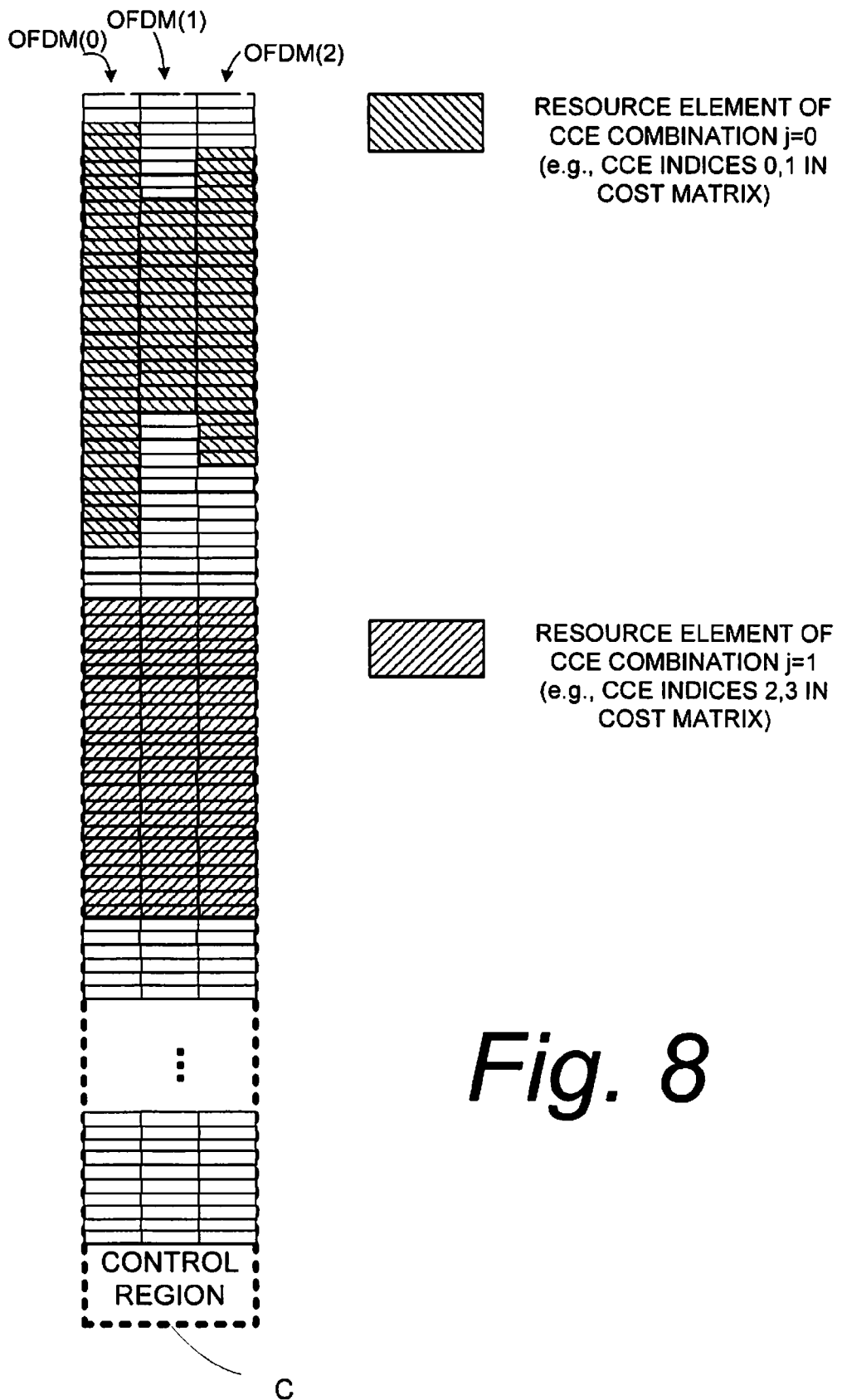
FIG. 8 is a diagrammatic view depicting a portion of an example control region of a subframe S for a scenario reflected by the example cost matrix of FIG. 7.

FIG. 8 depicts a portion of an example control region of a subframe S for the scenario reflected by the cost matrix of FIG. 7. In particular, FIG. 8 provides a graphic representation of two of the CCE_combinations listed in the cost matrix of FIG. 7, e.g., CCE_combination 0 and CCE_combination 1. The CCE_combination 0 comprises resource elements (REs) which are hatched with descending slopes; the CCE_combination 1 comprises resource elements (REs) which are hatched with ascending slopes. As such, CCE_combination 0 is shown to have 32 resource elements (REs) [8 resource element groups (REGs)] in the column of OFDM symbol OFDM(0); 16 resource elements (REs) [4 resource element groups (REGs)] in the column of OFDM symbol OFDM(1); and 24 resource elements (REs) [6 resource element groups (REGs)] in the column of OFDM symbol OFDM(2). CCE_combination 1 is shown to have 24 resource elements (REs) [6 resource element groups (REGs)] in the column of OFDM symbol OFDM(0); 24 resource elements (REs) [6 resource element groups (REGs)] in the column of OFDM symbol OFDM(1); and 24 resource elements (REs) [6 resource element groups (REGs)] in the column of OFDM symbol OFDM(2).

Since the standard constitutes that there always shall be 9 REGs per CCE, the total number of REGs allocated to each CCE combination in the table above, will be 18. Also notice that each REG consists of 4 REs."

It will be appreciated the resource elements (REs) comprising the CCE combinations of FIG. 8 can be arranged in the subframe S in a manner other than shown. For example, the resource elements (REs) belonging to the same control channel element (CCE) need not necessarily be vertically adjacent in the manner shown for simplicity in FIG. 8. Nor do the control channel elements (CCEs) utilized by the OFDM symbols not have to be situated in vertically proximate positions in the simplified example manner depicted in FIG. 8. This is because, as mentioned above, control channel elements (CCEs) and their constituent resource elements (REs) are spread out, both in time over the OFDM symbols used for PDCCH, and in frequency over the configured bandwidth, by the use, e.g., of operations including interleaving and cell-specific cyclic shifts, etc.

Moreover, the number of resource element groups (REGs) per OFDM symbol in the cost matrix of FIG. 7 above are only examples. The actual values for any such cost matrix have to be calculated using the CCE-to-REG mapping functions as defined by specifications such as the 3GPP Technical Specifications, e.g., 3GPP Technical Specification 36.211, V8.3.0 (2008-05), Technical Specification Group Radio Access Network; Evolved Universal Terrestrial Radio Access (E-UTRA); Physical channels and Modulation (Release 8); 3GPP Technical Specification 36.212, V8.3.0 (2008-06), Technical Specification Group Radio Access Network; Evolved Universal Terrestrial Radio Access (E-UTRA); Multiplexing and Channel Coding (Release 8); 3GPP Technical Specification 36.213, V8.3.0 (2008-05), Technical Specification Group Radio Access Network; Evolved Universal Terrestrial Radio Access (E-UTRA); Physical Layer Procedures (Release 8); all of which are incorporated herein by reference in their entirety.

It will be recalled, e.g., from FIG. 5, that the there are numerous possible non-limiting embodiments of control channel element (CCE) selection criterion (that improve performance of the telecommunications system). The acts of FIG. 6 apply generically to many of those differing criterion, including the resource element-based CCE selection criteria, the power-based CCE selection criteria, and the interference-based CCE selection criteria. At this point, however, discussion of remaining acts of FIG. 6 temporarily proceeds in the context of the resource element-based CCE selection criteria, in which the cost is expressed in terms of number of resource element groups (REGs) in each symbol for each CCE_combination. Thereafter other embodiments/selection criteria will also be discussed in the context of generic FIG. 6, particularly in conjunction with generic acts 6-2 and 6-8.

Act 6-2 of the method of FIG. 6 comprises initializing a cost variable for each OFDM symbol. Although the cost matrix of FIG. 7 shows three OFDM symbols, for sake of generalization the number of OFDM symbols will be represented as $N_{OFDM}$. Thus, in the resource element-based CCE selection criteria embodiment, act 6-2 represents a calculation, for each of the $N_{OFDM}$ OFDM symbols, of the total number of resource elements (REs) used to transmit aspects of the control region other than the Physical Downlink Control Channel (PDCCH). In other words, act 6-2 involves a determination of the number of resource elements (REs) used to transmit the reference signals (RSs), the Physical Control Format Indicator channel (PCFICH), and the Physical HARQ Indicator Channel (PHICH). Any holes in the reference signals (RSs), e.g., "RS-holes", are not counted in the computation of act 6-2. The output from act 6-2 is represented by a variable cost_total[ ], which is a vector with $N_{OFDM}$ values, one per OFDM symbol.

As an example of the computation performed as act 6-2, assume that the PHICH only is mapped to the first OFDM symbol, and that 3 PHICH groups are allocated to the first OFDM symbol. Thus, the initialized total_cost[0] for the first OFDM symbol is 114. The total_cost[0] value of 114 is obtained by (3*4 REGs*4 REs/REG for PHICH)+(4 REGs*4 REs/REG for PCFICH)+50 REs for the reference signals; i.e. 12*4+4*4+50 REs)=114. At this point, the cost notation [114 0 0] can be used to refer to the cost of the respective OFDM symbols 0, 1, and 2. That is, the total_cost of OFDM[0] is 114, the total_cost of OFDM[1] is 0, and the total_cost of OFDM[2] is 0, hence the expression/notation [114 0 0].

Act 6-3 of the method of FIG. 6 comprises determining which of the potential combinations of control channel element(s) is a valid combination of control channel element(s). That is, act 6-3 comprises determining all valid CCE combinations for current aggregation level (with respect to RNTI, subframe number, DCI format, common/UE-specific etc.), and removing any invalid CCE_combinations from the cost matrix. The entire set of valid combinations is given by the standard, TS36.213. It depends on RNTI, sfn, etc as stated above. Furthermore, already allocated CCE-combinations can not be used, i.e. they are invalid.

For example, in the example scenario of the cost matrix of FIG. 7, supposed that the only valid CCE_combinations are CCE_combinations j, j=3, 4, 5, 6, 7, and 8. In other words, CCE_combinations j=0,1, and 9 are invalid combinations. In view of the fact that the aggregation level is 2, it will then be incumbent upon PDCCH CCE selector 40 to select one of these CCE_combinations according to predetermined criteria, e.g., predetermined system criteria such as load per OFDM symbol, power usage, or interference, as described herein. Thus, unlike prior art techniques of routinely including a next available pair/combination or choosing a random pair, PDCCH CCE selector 40 of base station 28 is configured to determine which control channel element(s) to use for a physical downlink control channel (PDCCH) comprising the subframe according to criteria that improves performance of the telecommunications system.

FIG. 6 further depicts as CCE selection logic 70 various example, representative acts or steps which are executed or performed by PDCCH CCE selector 40 in its determination of which control channel element(s) to use for a physical downlink control channel (PDCCH) according to criteria that improves performance of the telecommunications system. Act 6-4 of CCE selection logic 70 comprises evaluating a cost function C(j) for each valid combination (j) of control channel element(s) over symbols comprising a control portion of the subframe.

In an example implementation, performing act 6-4 comprises, for all CCE_combinations in a set valid_CCE_combinations, calculating a cost function described by Expression 1:

$$C(j) = \sum_{i=0}^{N_{OFDM}-1} (\text{cost\_total}(i) + 4 \cdot \text{cost\_matrix}(j, i)) \quad \text{Expression 1}$$

$j \in \text{valid\_CCE\_combinations}$

The number "4" is utilized in Expression 1 in view of the fact that there are four resource elements (REs) per resource element group (REG). The evaluations of the cost function C(j) are used to select a valid combination of control channel element(s) according to the criteria that improves the performance. If the set of valid_CCE_combination is non-zero then one combination will be selected. This is then repeated iteratively for each PDCCH One example way of using the evaluations of the cost function C() is represented by the remaining acts of FIG. 6. For example, act 6-5 of FIG. 6 comprises selecting a best of the valid CCE_combinations based on the evaluations of act 6-4. In an example implementation, therefore, act 6-5 comprises selecting the particular CCE_combination $j_k$ that had the minimum cost function, e.g., for which $C(j=j_k)$ had the lowest cost.

Act 6-6 comprises CCE selection logic 70 checking whether, at this point, all the control channel elements (CCEs) that will be used for the Physical Downlink Control Channel (PDCCH) have been processed. If all the control channel elements (CCEs) that will be used for the Physical Downlink Control Channel (PDCCH) have indeed been processed, selection of the control channel elements (CCEs) for this subframe is completed (as reflected by act 6-7). If there are unprocessed PDCCHs and more CCEs still available, then CCE selection logic 70 is executed for any remaining PDCCHs for which control channel elements (CCEs) must be selected. The manner of selection of control channel elements (CCEs) for other PDCCHs is essentially the same as and understood from the foregoing description of the method of FIG. 6.

After a first such CCE_combination is selected by performance of act 6-5, and assuming that further control channel elements (CCEs) are to be selected for the PDCCH, as act 6-8 the CCE selection logic 70 updates the total cost to be used when assigning control channel elements (CCEs) to the next PDCCH candidate. In an example implementation, the total cost update for OFDM symbol i can comprise evaluation of an expression such as Expression 2:

cost_total(i)=cost_total(i)+
    4·cost_matrix($j_k$,i) i∈[0, ..., $N_{OFDM}$−1]    Expression 2

Thus, the total cost for the first selected CCE-combination is factored into a decision for selecting a further CCE_combination for the next PDCCH of the subframe.

After act 6-8 processing continues so that a loop comprising at least act 6-4 act 6-5, and act 6-6 are again performed to select, according to the predetermined criteria, a further valid set of control channel elements (CCEs) for inclusion in another Physical Downlink Control Channel (PDCCH) of the subframe S.

Discussed above are, e.g., resource element (RE)-load based control channel element (CCE) selection strategy embodiments and modes wherein the criteria utilized by PDCCH CCE selector 40 is a predetermined distribution of total number of transmitted resource elements per symbol, e.g., a most even distribution of the total number of transmitted resource elements per symbol. As alluded to above (see, e.g., FIG. 5), the technology disclosed herein also encompasses other embodiments and modes, such as power load-based CCE selection and interference-based CCE selection.

In the power load-based CCE selection embodiment and mode, the selection criteria utilized by PDCCH CCE selector 40 is a predetermined distribution of total used transmission power per symbol, e.g., a most even distribution of total number of transmission power per symbol. An objective in power load-based CCE selection is to distribute the available power evenly among the OFDM symbols. The power load-based CCE selection embodiment and mode is essentially also performed in accordance with the example, non-limiting, representative acts of FIG. 6. However, in the FIG. 6 context, the "cost" is in terms of power usage. For example, the initializing act 6-2 when performed for the power load-based CCE selection embodiment and mode is in terms of power usage. Act 6-2 for the power load-based CCE selection embodiment and mode comprises initialize the total cost variable, cost_total, with the total power used to transmit the reference signals, PCFICH, and PHICH in each OFDM symbol.

In an example implementation, the act 6-4 can comprise evaluation of Expression 3:

$$C(j) = \sum_{i=0}^{N_{OFDM}-1} (\text{cost\_total}(i) + PSD_{PDCCH}(i) \cdot 4 \cdot \text{cost\_matrix}(j, i)) \quad \text{Expression 3}$$

$$j \in \text{valid\_CCE\_combinations}$$

In Expression 3, the term $PSD_{PDCCH}(i)$ is the power per PDCCH Resource Element. The term $PSD_{PDCCH}(i)$ can, in one example implementation, be equal for all PDCCH resource elements (REs). Alternatively, in another example implementation the term $PSD_{PDCCH}(i)$ can be individual (e.g., distinctive or different) per OFDM symbol and/or PDCCH candidate. The PDDCH CCE selector 40 obtains a value for $PSD_{PDCCH}(i)$ by any of various appropriate methods. These methods can range from simple ones with predetermined power values to more complex ones including adaptation to link quality. These methods of setting a value for this PSD are typically included in what is commonly called Link adaptation functionality.

Act 6-8 for the power load-based CCE selection embodiment and mode comprises updating the cost function C(j) in terms of power usage. Thus, in an example implementation, updating the cost function can comprise evaluation of Expression 4:

cost_total($i$)=cost_total($i$)+$PSD_{PDCCH}(i)$·4·cost_matrix($j_k,i$) $i \in [0, \ldots, N_{OFDM}-1]$    Expression 4

In Expression 4, the term $PSD_{PDCCH}(i)$ is again the power per PDCCH Resource Element. The term $PSD_{PDCCH}(i)$ can be uniform or different per OFDM symbol and/or PDCCH candidate as discussed above.

In the interference-based CCE selection embodiment and mode, the selection criteria utilized by PDCCH CCE selector 40 is a predetermined distribution of total interference per symbol, e.g., a most even distribution of interference per symbol. An objective in interference-based CCE selection is to distribute the interference evenly among the OFDM symbols. The interference-based CCE selection embodiment and mode is essentially also performed in accordance with the example, non-limiting, representative acts of FIG. 6. However, in the FIG. 6 context, the "cost" is in terms of interference. For example, the initializing act 6-2 when performed for the interference-based CCE selection embodiment and mode is in terms of interference. Act 6-2 for the interference-based CCE selection embodiment and mode comprises initialize the total cost variable, cost_total, with the total interference caused by the reference signals, PCFICH, and PHICH in each OFDM symbol, as well as any other interference information that one wants to include, e.g., estimated interference caused by other cells or other systems or whatever.

In an example implementation, act 6-4 can comprise evaluation of Expression 5:

$$C(j) = \sum_{i=0}^{N_{OFDM}-1} (\text{cost\_total}(i) + I(i) \cdot 4 \cdot \text{cost\_matrix}(j, i)) \quad \text{Expression 5}$$

$$j \in \text{valid\_CCE\_combinations}$$

In Expression 5, the term I(i) is the interference weight per PDCCH Resource Element. The term I(i) can, in one example implementation, be equal for all PDCCH resource elements (REs). Alternatively, in another example implementation the term I(i) can be individual (e.g., distinctive or different) per OFDM symbol and/or PDCCH candidate. The PDCCH CCE selector 40 can obtain a value for I(i) according to any of various methods. I(i) at this stage only corresponds to the interference caused by ourselves. Hence the interference I(i) utilized could very well be approximated. Interference caused by other cells, systems or whatever is preferably included already in the initialization.

Act 6-8 for the interference load-based CCE selection embodiment and mode comprises updating the cost function C(j) in terms of caused interference. Thus, in an example implementation, updating of the cost function can comprise evaluation of Expression 6:

cost_total($i$)=cost_total($i$)+
$I(i)$·4·cost_matrix($j_k,i$) $i \in [0, \ldots, N_{OFDM}]$    Expression 6

In Expression 6, the term I(i) is again the interference caused per PDCCH Resource Element. The term I(i) can be uniform or different per OFDM symbol and/or PDCCH candidate as discussed above.

The interference load-based CCE selection embodiment and mode thus further evens out the caused interference. In addition to handling the interference, the technology disclosed herein can also handle the available transmit power. That is, as a result of the selected approach for the interference management, handling the interference and the available transmit power can however be done jointly. A balanced interference can be achieved more or less implicitly while control channel elements (CCEs) are selected in order to obtain a high transmit power utilization. This means that both the transmit power as well as the caused interference is spread even more carefully over the OFDM symbols compared to what is achieved implicitly from the interleaving and the random like cell based shift since these operation only takes the PDCCH into account, not the already assigned reference signals (RSs), PCFICH and PHICH.

As a variation of the interference load-based CCE selection embodiment and mode, higher interference weights I(i,j) can be assigned to CCE combinations that map to resource element groups (REGs) at some part of the frequency band if there is a desire to decrease the interference in this part of the frequency band due to interference problems in neighboring cells, etc. To facilitate this usage, the cost matrix should for this variation include the frequency dimension. This is directly obtained by replacing or complementing OFDM(0), OFDM(1), OFDM(2) with (for example) frequency.band(0), frequency.band (1), frequency.band (2), frequency.band (3), etc.

Thus, it can be seen from the foregoing that, in at least one example implementation, the PDCCH CCE selector 40 is configured to determine which control channel element(s) to use for the physical downlink control channel (PDCCH), for plural combinations of control channel element(s), by: (1) evaluating a cost function C(j) for each valid combination (j) of control channel element(s) over symbols comprising a control portion of the subframe; and (2) using evaluations of the cost function C(j) to select a valid combination of control channel element(s) according to the criteria that improves the performance. The number of control channel elements (CCEs) included in the valid combination is dependent upon an aggregation level utilized for a certain PDCCH in the subframe.

In an example implementation, in calculating the cost function C(j) the selector is configured, for each valid combination of control channel element(s), to include, in the evaluations of the cost function C(j) over all symbols comprising a control portion of the subframe of control channel(s), cost(s) other than the physical downlink control channel (PDCCH).

In an example embodiment, in order to determine which control channel element(s) to use for a physical downlink control channel (PDCCH), the PDCCH CCE selector 40 is configured to: (a) prepare a cost matrix to express, for each potential combination of control channel element(s), a number of resource element groups residing in each symbol of a control portion of the subframe; (b) determine which of the potential combinations of control channel element(s) is a valid combination of control channel element(s); and (c) evaluate a cost function C(j) for each valid combination (j) of control channel element(s) over symbols comprising a control portion of the subframe.

A separate and distinct aspect of the technology disclosed herein is the use of a table or data arrangement such as a cost matrix which includes information for CCE_combinations and the like. In such a cost matrix, exemplified by the sample cost matrix of FIG. 7, a number of resource elements (REs) in each OFDM symbol is pre-calculated and tabularized for each CCE index. Using this pre calculated information, CCE indexes can be selected with the additional targets in mind. Hence, when there are alternatives, CCEs resulting in a more balanced resource element (RE) distribution or power consumption over different OFDM symbols can be selected in favor of their alternatives.

The technology disclosed herein thus takes into consideration the mapping to resource elements (REs) in eNodeB when deciding upon which CCEs to utilize for transmission (e.g., to include in a Physical Downlink Control Channel (PDCCH)). Among the different allowed CCE mapping alternatives, as one example embodiment the one giving the most even distribution of total number of transmitted REs per OFDM symbol should be chosen. Alternatively, as another example embodiment, the CCE mapping giving the most even distribution of totally used power per OFDM symbol should be chosen. Due to the nature of the standardized interleaving pattern and cyclical shifting, there are just a few alternatives that need to be calculated. Furthermore all these alternatives can typically be precalculated and tabulated (into a cost matrix) which makes it suitable for implementation.

By applying the knowledge about where the CCEs are to be transmitted in the time/frequency grid of the control region, the PDCCH CCE selector 40 performs the control channel element (CCE) selection with the objective to achieve a balance with respect to used resource elements (REs) per OFDM symbol or used power per OFDM symbol. Hence, when the CCE assignment functionality has a choice between several different CCE allocations for a PDCCH with a given size. The one to be chosen is the one that minimizes the difference between the number of totally used resource elements (REs) for different OFDM symbols in the control region. Alternatively, the control channel element (CCE) allocation that minimized the difference between the used power for different OFDM symbols in the control region should be chosen.

The technology disclosed herein has myriad advantages. Prior art control channel element (CCE) selection techniques make control channel element (CCE) selection primarily to obtain an appropriate code rate for the transmission, and so that the CCEs selected for transmission are included in the search space on the receiver side. In principal this means two things. That the UE will try to decode the message and that there will be a reasonable amount of energy for the UE to be able to do this properly. In addition to these objectives, the technology disclosed herein makes control channel element (CCE) selection related to system performance. For example, the PDCCH CCE selector 40 makes control channel element (CCE) selection decisions taking into consideration to which resource elements (REs) of which OFDM symbols a certain control channel element (CCE) actually corresponds to. Such performance enhancing aspects include transmit power availability and interference balance between different OFDM symbols.

As a result, a more effective usage of the transmit power can be achieved at the same time as the interference balance is better ensured. Ensuring a high power utilization, especially in the control region, is beneficial in order to be able to fully utilize the limited PDCCH capacity, which otherwise is often considered a potential bottleneck in LTE networks.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a node of a telecommunications system, the method comprising:
constructing a subframe of information for transmission over a radio interface, wherein symbols of the subframe are to be transmitted on subcarriers in a frequency domain, wherein one symbol on one subcarrier in the subframe defines a resource element, wherein a predetermined number of resource elements define a control channel element; and selecting one or more control channel elements to use for a physical downlink control channel (PDCCH) comprising the subframe according to criteria that improves performance of the telecommunications system, wherein selecting comprises, for valid combinations of the control channel elements:

evaluating a cost function C(j) for each valid combination (j) of the control channel elements over ones of the symbols comprising a control portion of the subframe; and using evaluations of the cost function C(j) to select one of the valid combinations of the control channel elements according to the criteria that improves the performance.

2. The method of claim 1, wherein the selection according to the criteria provides a predetermined distribution of a total number of transmitted resource elements per symbol.

3. The method of claim 2, wherein the selection according to the criteria provides a substantially even distribution of the total number of transmitted resource elements per symbol.

4. The method of claim 1, wherein the selection according to the criteria provides a predetermined distribution of a total used transmission power per symbol.

5. The method of claim 4, wherein the selection according to the criteria provides a substantially even distribution of the total used transmission power per symbol.

6. The method of claim 1, wherein the selection according to the criteria provides a predetermined distribution of interference per symbol.

7. The method of claim 6, wherein the criteria provides a substantially even distribution of the interference per symbol.

8. The method of claim 1, wherein calculating the cost function C(j) comprises, for each valid combination of the control channel elements:

including, in the evaluations of the cost function C(j) over the ones of the symbols comprising a control portion of the subframe, one or more costs other than the physical downlink control channel (PDCCH).

9. A method of operating a node of a telecommunications system, the method comprising:

constructing a subframe of information for transmission over a radio interface, wherein symbols of the subframe are to be transmitted on subcarriers in a frequency domain, wherein one symbol on one subcarrier in the subframe defines a resource element, wherein a predetermined number of resource elements define a control channel element; and selecting one or more control channel elements to use for a physical downlink control channel (PDCCH) comprising the subframe according to criteria that improves performance of the telecommunications system, wherein selecting comprises:

preparing a cost matrix to express, for each potential combination of the control channel elements, a number of resource element groups residing in each symbol of a control portion of the subframe;

determining which of the potential combinations of the control channel elements is a valid combination of control the control channel elements; and evaluating a cost function C(j) for each valid combination (j) of the control channel elements over ones of the symbols comprising a control portion of the subframe.

10. A base station node for a telecommunications system comprising:

a transceiver configured to transmit a subframe of information for transmission over a radio interface wherein symbols of the subframe are transmitted on subcarriers in a frequency domain, wherein one symbol on one subcarrier in the subframe defines a resource element, wherein a predetermined number of resource elements define a control channel element; and a selector configured to determine one or more control channel elements to use for a physical downlink control channel (PDCCH) comprising the subframe according to criteria that improves performance of the telecommunications system for valid combinations of the control channel elements, by:

evaluating a cost function C(j) for each valid combination (j) of the control channel elements over ones of the symbols comprising a control portion of the subframe; and using evaluations of the cost function C(j) to select one of the valid combinations of the control channel elements according to the criteria that improves the performance.

11. The node of claim 10, wherein the selection according to the criteria provides a predetermined distribution of a total number of transmitted resource elements per symbol.

12. The node of claim 11, wherein the selection according to the criteria provides a substantially even distribution of the total number of transmitted resource elements per symbol.

13. The node of claim 10, wherein the selection according to the criteria provides a predetermined distribution of a total used transmission power per symbol.

14. The node of claim 13, wherein the selection according to the criteria provides a substantially even distribution of the total power per symbol.

15. The node of claim 10, wherein the selection according to the criteria provides a predetermined distribution of interference per symbol.

16. The node of claim 15, wherein the criteria provides a substantially even distribution of the interference per symbol.

17. The node of claim 10, wherein in calculating the cost function C(j), the selector is configured, for each valid combination of the control channel elements to include, in the evaluations of the cost function C(j) over the ones of the symbols comprising the control portion of the subframe, one or more costs other than the physical downlink control channel (PDCCH).

18. A base station node for a telecommunications system comprising:

a transceiver configured to transmit a subframe of information for transmission over a radio interface wherein symbols of the subframe are transmitted on subcarriers in a frequency domain, wherein one symbol on one subcarrier in the subframe defines a resource element, wherein a predetermined number of resource elements define a control channel element; and a selector configured to determine one or more control channel elements to use for a physical downlink control channel (PDCCH) comprising the subframe according to criteria that improves performance of the telecommunications system, wherein to determine the one or more control channel elements, the selector is configured to:

prepare a cost matrix to express, for each potential combination of the control channel elements, a number of resource element groups residing in each symbol of a control portion of the subframe;
determine which of the potential combinations of the control channel elements is a valid combination of the control channel elements; and
evaluate a cost function $C(j)$ for each valid combination (j) of the control channel elements over ones of the symbols comprising a control portion of the subframe.

* * * * *